United States Patent [19]
Viertel et al.

[11] Patent Number: 6,012,757
[45] Date of Patent: Jan. 11, 2000

[54] SUN VISOR FOR VEHICLES

[75] Inventors: Lothar Viertel, Altforweiler, Germany; Patrick Welter, La Chambre, France

[73] Assignee: Becker Group Europe GmbH, Wuppertal, Germany

[21] Appl. No.: 09/122,487

[22] Filed: Jul. 24, 1998

[51] Int. Cl.[7] .................................................. B60J 3/02
[52] U.S. Cl. ........................................ 296/97.2; 296/97.5
[58] Field of Search .............................. 296/97.5, 97.2; 362/97.1, 135, 140

[56]  References Cited

U.S. PATENT DOCUMENTS

| | | | |
|---|---|---|---|
| 4,378,129 | 3/1983 | Kaiser et al. ............................ | 296/97.5 |
| 4,973,020 | 11/1990 | Canadas ................. | 296/97.2 X |
| 5,184,888 | 2/1993 | Sakuma et al. ..................... | 296/97.2 X |
| 5,203,623 | 4/1993 | Viertel et al. ....................... | 296/97.2 X |
| 5,340,186 | 8/1994 | Aymerich et al. .................. | 296/97.2 X |
| 5,401,073 | 3/1995 | Viertel et al. ....................... | 296/97.5 X |
| 5,429,407 | 7/1995 | Buchheit et al. ...................... | 296/97.2 |
| 5,727,837 | 3/1998 | Viertel ................. | 296/97.5 X |
| 5,895,087 | 4/1999 | Viertel et al. .......................... | 296/97.5 |

*Primary Examiner*—Joseph D. Pape
*Attorney, Agent, or Firm*—Harness, Dickey & Pierce, P.L.C.

[57]  ABSTRACT

A sun visor for vehicles, including a hollow, blow-molded sun visor body. The sun visor body has a first wall, forming an essentially flat broad side of the sun visor body, and a second wall, forming a broad side of the sun visor body. The second wall has a tub-shaped depression, wherein the depression receives a mirror and a bordering frame holding the mirror. The depression has a bottom and walls which peripherally surround the bordering frame and are formed during blow molding of the sun visor body around an outer bead of the bordering frame, while forming a groove which receives the outer bead in an interlocked manner.

20 Claims, 4 Drawing Sheets

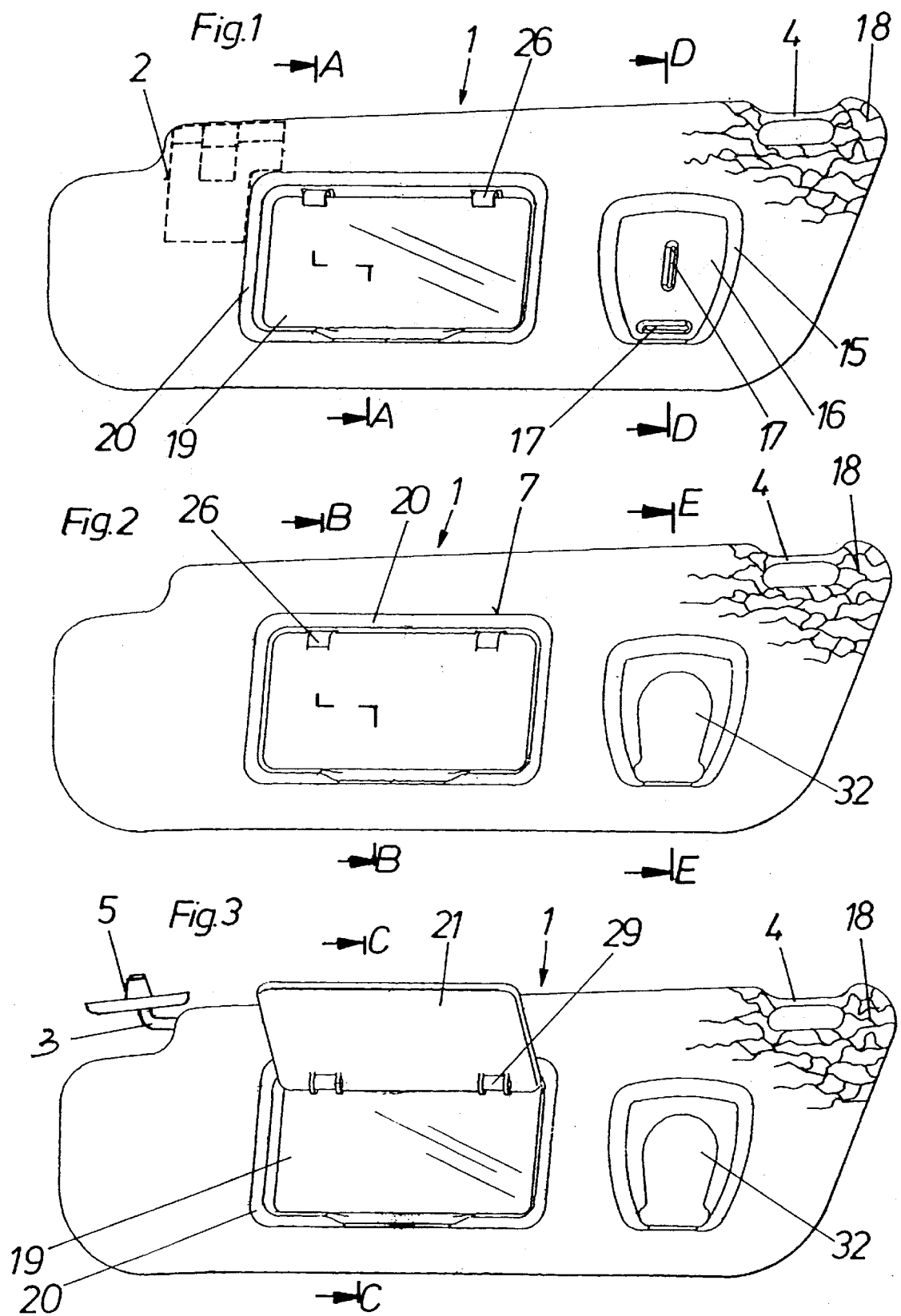

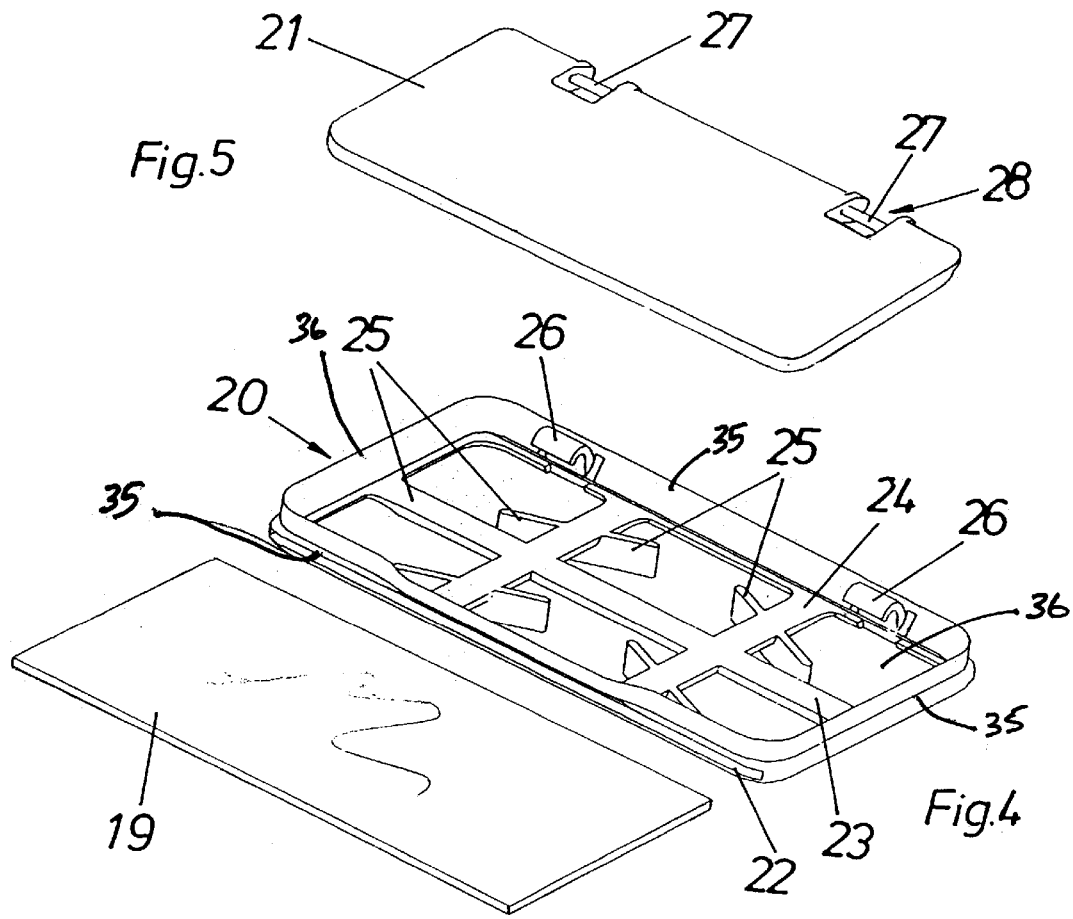
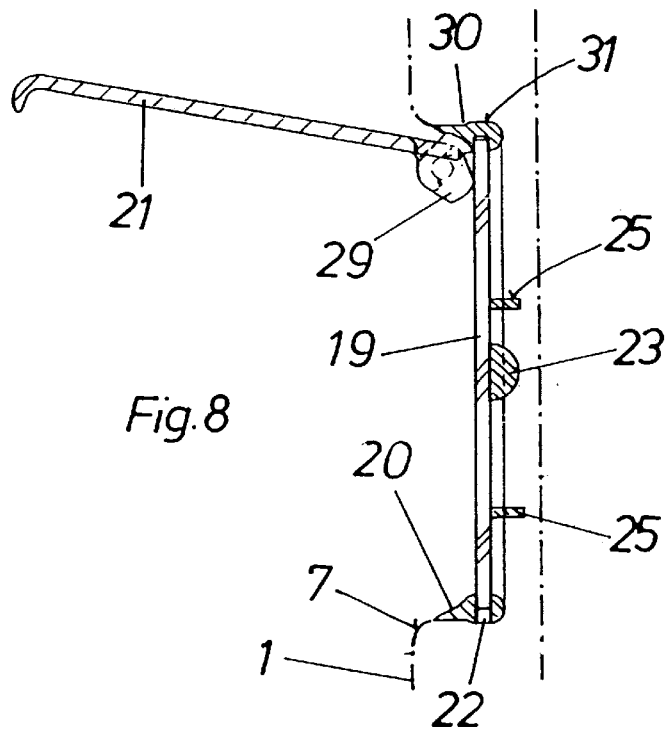

SUN VISOR FOR VEHICLES

FIELD OF THE INVENTION

The invention relates to a sun visor for vehicles with a hollow, blow-molded sun visor body, having a first wall and a second wall. The first wall forms an essentially flat broad side of the sun visor body. The second wall forms a broad side of the sun visor body with a tub-shaped depression, wherein the depression receives a mirror and a bordering frame holding the mirror.

BACKGROUND OF THE INVENTION

Sun visors of the type in accordance with the species are known. For example, see European Patent Publication EP 0 401 750 A1. The manufacture of the known sun visor, which is put together from many individual parts, is quite elaborate and expensive, especially to the arrangement of a mirror in the sun visor body.

SUMMARY OF THE INVENTION

It is an object of the instant invention to create a sun visor of the type mentioned above, which is relatively simple to manufacture, includes only a few parts, is dimensionally stable and has a pleasing appearance.

The sun visor in accordance with the invention is simple to manufacture, since a later fastening arrangement of the mirror together with the bordering frame is no longer required. Instead, the sun visor body is now formed around the bordering frame in sections. The production is not only made simpler by means of this, but the stability of the sun visor body as well as a pleasing appearance are also increased.

Another object of the present invention is to supply a preassembled unit, including the mirror and the mirror frame, to the blow-molding tool, and to blow-mold the sun visor body on this unit. This lends the sun visor body a particularly great solidity and stiffness, particularly since a support of the one broad side of the sun visor body results on the other broad side.

In one embodiment, stabilizing beads are provided, which furthermore are designed open and therefore in the shape of bushings, and thus are particularly well suited for the frictionally connected holding of plug pins of an add-on element.

Another object of the present invention is to make it possible to recycle the visor body, because it is manufactured from polypropylene, which is particularly easy to recycle.

Another object of the present invention is to offer the advantage that it becomes possible to omit the otherwise customary covering of the sun visor body with a decor material.

One aspect of the present invention provides a sun visor for vehicle which includes a hollow, blow-molded sun visor body. The sun visor body has a first wall and a second wall. The first wall forms an essentially flat broad side of the sun visor body. The second wall forms a broad side of the sun visor body. The second wall defines a tub-shaped depression in the second wall. A mirror and a bordering frame are also provided. The bordering frame holds the mirror.

The bordering frame is comprised of four edges which form a generally rectangular frame defining a generally rectangular opening inward of the four edges. The bordering frame has a groove receptacle which is open along at least one edge of the bordering frame. The groove receptacle extends around the edges of the mirror. The bordering frame further includes horizontally oriented ribs, which pass through the frame opening for the rear support of the mirror. The bordering frame further includes vertically oriented ribs which point away from the mirror and are arranged on the horizontally oriented ribs. The vertically oriented ribs are supported on the inner surface of the first wall of the sun visor body.

The tub-shaped depression receives the mirror and the bordering frame. The tub-shaped depression has a bottom and walls. The depression walls peripherally surround the bordering frame and are formed during blow molding of the sun visor body. The bordering frame includes an outer bead formed during blow-molding of the sun visor body. The tub-shaped depression includes a groove, and the groove receives the outer bead in an interlocked manner to interlock the bordering frame to the sun visor body.

Preferably, a hinged cover is hinged on the bordering frame. The hinged cover covers the mirror when the mirror is not in use.

Preferably, the sun visor further comprises an add-on element which has plug pins. In one embodiment, the sun visor body is embodied with beads which extend from the outer surface of the second wall until they rest against the inner surface of the first wall. In another embodiment, the second wall defines a recess, and the recess has bottom beads which extend from the bottom of the recess until they rest against the inner surface of first wall. The beads are provided for stabilizing the sun visor body and are provided for receiving the plug pins of the add-on element.

These and other objects, advantages, and features of the present invention will be better understood upon review of the following detailed description of the preferred embodiments.

BRIEF DESCRIPTION OF SEVERAL VIEWS OF THE DRAWINGS

FIG. 1 illustrates a sun visor body with a mirror and bordering frame,

FIG. 2 illustrates the sun visor body supplemented by a hinged cover and a ticket clip, FIG. 3 illustrates the sun visor body of FIG. 2 with the hinged cover in the open position, FIG. 4 is a diagrammatic view of the mirror and the bordering frame, FIG. 5 is a diagrammatic view of the hinged cover;

FIG. 8 is a sectional view along line C—C in FIG. 3,

DETAILED DESCRIPTION OF THE PREFERRED EMBODIMENTS

Figure 6:
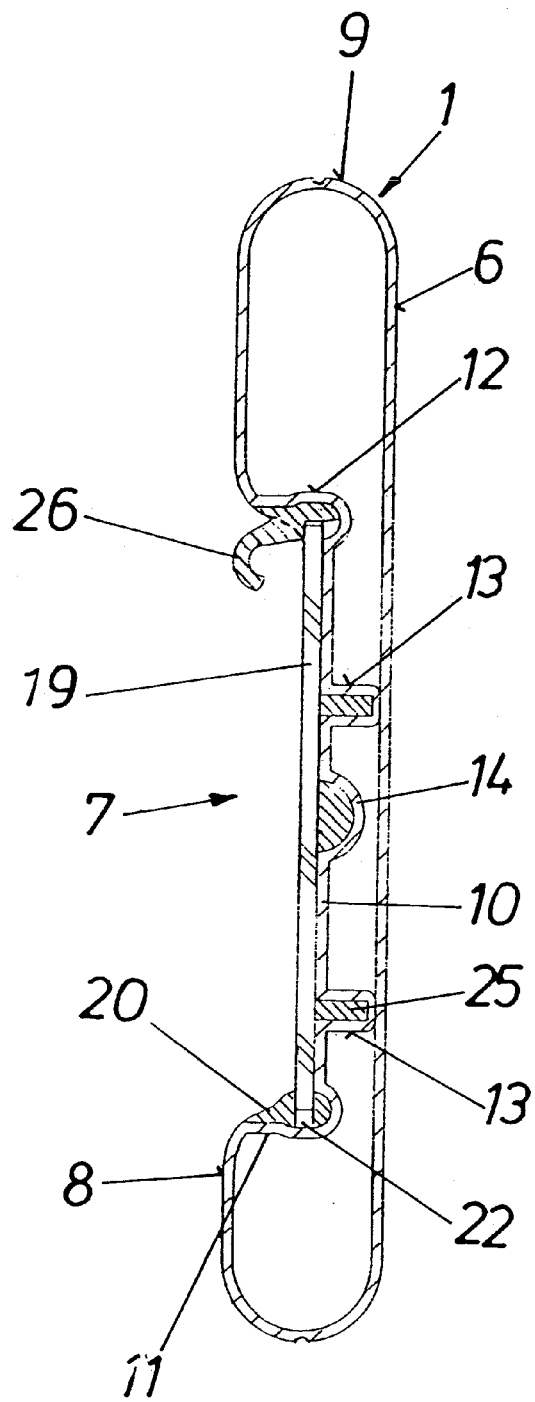
FIG. 6 is a sectional view along line A—A in FIG. 1.

As shown in FIGS. 1, 2 and 3, the novel sun visor has a hollow, blow-molded sun visor body 1. At one end of the sun visor body 1, a bearing body 2 for seating a sun visor shaft 3 is arranged, preferably in accordance with the teachings of German patent application 196 35 683.0. At the other end of the sun visor body 1, the sun visor body 1 is designed in one piece and of the same material as a counter-bearing pin 4. As shown in FIG. 3, a pivot bearing housing 5, which is connected by one end with the sun visor shaft 3, and a counter-bearing housing (not shown) in which the counter-pin 4 can be snapped, are used for arranging the sun visor on a vehicle body.

Figure 7:
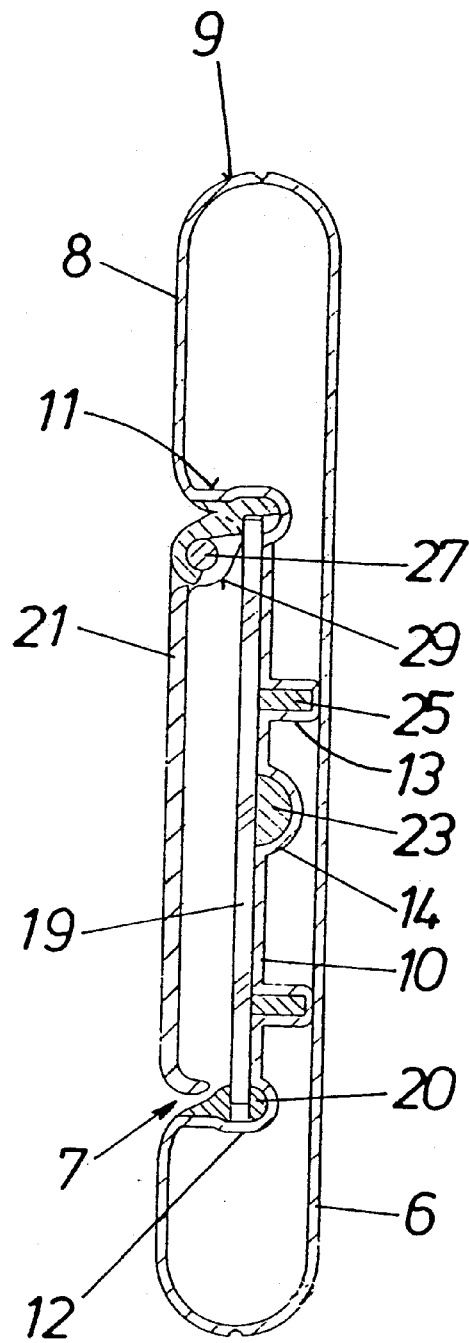
FIG. 7 is a sectional view along line B—B in FIG. 2.

As shown in FIGS. 6, 7, 9 and 10, the sun visor body 1 has a first wall 6 and a second wall 8. The first wall 6 forms an essentially flat broad side of the sun visor body 1. As shown in FIGS. 6, 7 and 8, the second wall 8 forms a broad side of the sun visor body 1 with a tub-shaped depression 7. The depression 7 is approximately rectangular and has rounded corners. The walls 6 and 8 pass into each other via a circumferential rounding 9 of the wall. The tub-shaped depression 7 has a bottom 10 and walls 11. The depression walls 11 connect the second wall 8 with the bottom 10 of the depression 7. The walls 11 are designed with a circumferential groove 12. Beads 13, which are supported on the inside of the first wall 6 of the sun visor body 1, as well as other beads 14 of lesser depth, extend from the bottom 10 of the tub-shaped depression 7 toward the first wall 6.

Figures 9, 10:
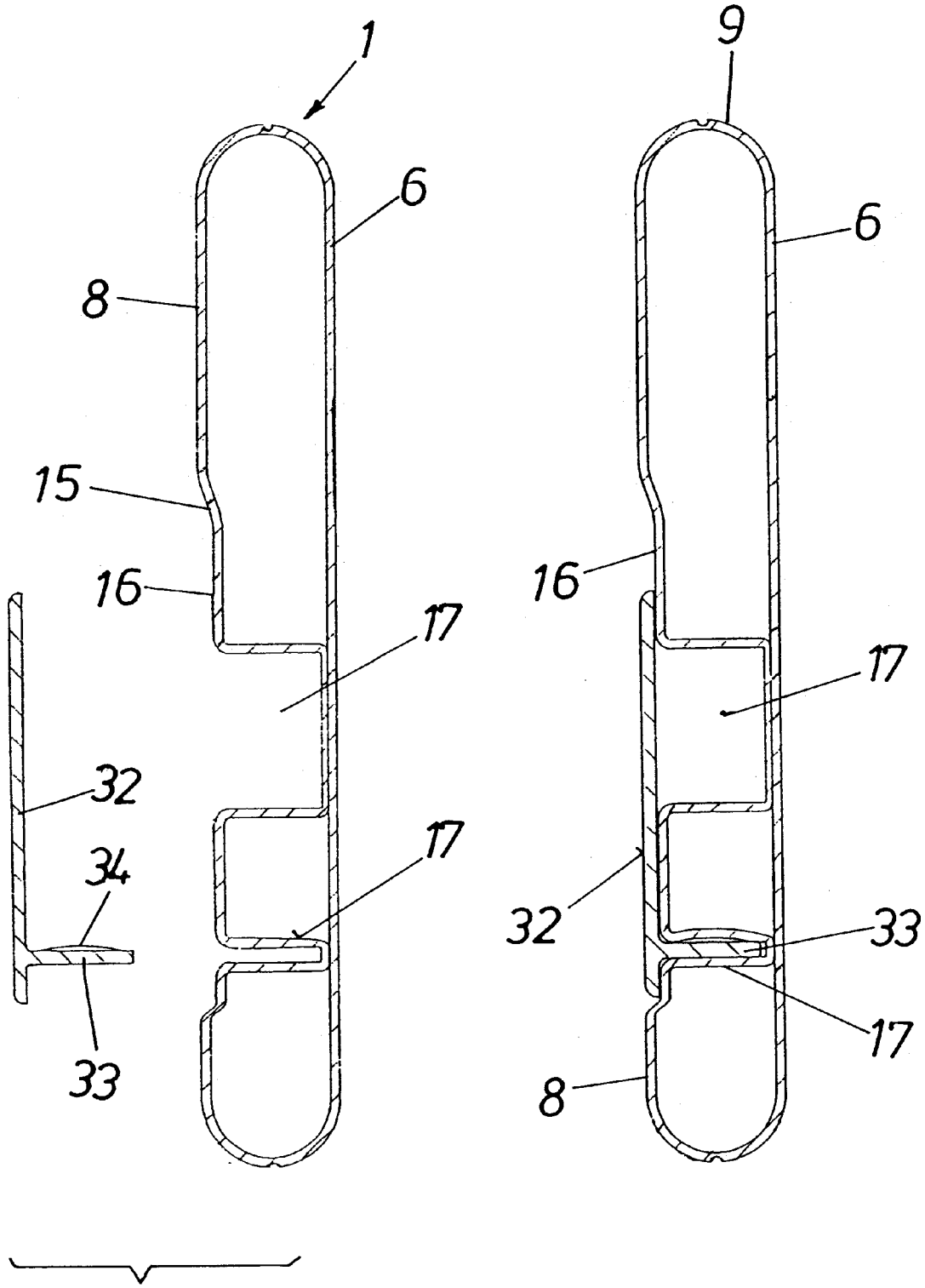
FIG. 9 is a sectional view along line D—D in FIG. 1.
FIG. 10 is a sectional view along line E—E in FIG. 2.

As shown in FIG. 1, set slightly apart from the tub-shaped depression 7, the second wall 8 of the sun visor body 1 also has a recess 15. As shown in FIGS. 9 and 10, the recess 15 has a bottom 16, from which extend two further beads 17. The beads 17 are aligned vertically in respect to each other and are supported on the inner surface of the oppositely located wall 6 of the sun visor body 1.

The sun visor body 1 preferably is a blow-molded body made of polypropylene (PP) material, having a grainy surface structure 18, as shown in FIGS. 1 through 3.

As shown in FIGS. 1 through 3 and FIGS. 6 through 8, a built-in unit is arranged in the tub-shaped depression 7. The built-in unit comprises at least a mirror 19 and a bordering frame 20 holding the mirror 19. Preferably, the built-in unit also includes a hinged cover 21. The mirror 19 can be a glass mirror, which has a splinter-proof protection device (not shown) of the conventional type on the back of the mirror 19.

As shown in FIG. 4, the bordering frame 20 holding the mirror 19 is designed in the manner of a cassette and has four edges 35 which form a generally rectangular frame defining a generally rectangular opening 36 inward of the four edges. The bordering frame 20 has a groove receptacle 22, which is open along a frame edge 35 for inserting the mirror 19. As a bottom, the bordering frame 20 has a longitudinal rub 23 and two transverse ribs 24 crossing the longitudinal rib 23. The mirror 19 is supported on the longitudinal rib 23 and the transverse ribs 24. Vertically oriented ribs 25, pointing away from the mirror 19, are formed in an oblique orientation on the transverse ribs 24 of the bordering frame 20. The frame 20 preferably is designed as an injection-molded plastic element.

As shown in FIG. 4, the bordering frame 20 furthermore has hinged hooks 26. The hinged hooks 26 are formed on one of the longitudinal edges of the frame 20 and are used for the suspension of bearing pins 27. As shown in FIG. 5, the bearing pins 27 have been formed on the hinged cover 21 in bridge recesses 28, which are open at the edge of the cover 21.

As shown in FIG. 8, the hinged cover 21 is equipped with segment bodies 29 formed thereon, which slide on the mirror 19 and are used to maintain the hinged cover 21 either in the position wherein it exposes the mirror 19, or in the position wherein it covers the mirror 19. The bordering frame 20 is designed with a circumferential bead 31, starting at a step-shaped shoulder 30 and being received in the groove 12 of the sun visor body 1 in an interlocking manner.

The mirror 19 and the bordering frame 20 are assembled and connected with the sun visor body 1. However, the conventional adhesive, welding, screwing or anchoring techniques are now not used for making the connection. Instead, a connection is made by molding the sun visor body 1 around the assembly. A two-part molding tool is used for this production, whose mold halves are moved apart so that they can receive the section of an extruded film envelope made of a thermoplastic material, preferably polypropylene. While or before the film envelope is placed into the open blow mold, the unit comprised of the mirror 19 and the bordering frame 20 is positioned on the inside of one mold half at an exactly predetermined location and held there by holding means. In this manner, the unit becomes a part of the mold cavity, against whose walls the film envelope is blow-molded by blowing in air. During blow molding, the foil envelope is heated to just below the melting point of the material and is therefore capable of forming the bead 31, the same as the beads 13 and 14, which are shown particularly clearly in FIGS. 6 and 7. A sun visor body 1 is obtained after the cooling and setting of the film envelope material, which is then intimately, interlockingly and unreleasably connected with the bordering frame 20 holding the mirror 19.

In a following step, the hinged cover 21 is suspended in the hinged hooks 26 of the frame 20, although it would be conceivable to perform this step even prior to the connection of the bordering frame 20 with the sun visor body 1.

In a following step, as shown in FIG. 1 and FIGS. 9 and 10, it is also possible to attach an add-on element, in the form of a ticket clip 32 or the like to the sun visor body 1, where the ticket clip 32 is arranged in the area of the recess 15 and is fastened by means of pins 33. The pins 33 are held frictionally connected with the beads 17. The fastening quality can be further increased by a resilient camber 34 of the pins 33.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A sun visor for vehicles comprising:
   a hollow, blow-molded sun visor body, said sun visor body having a first wall and a second wall, said first wall forming an essentially flat broad side of the sun visor body, said second wall forming a broad side of the sun visor body, said second wall defining a tub-shaped depression in said second wall,
   a mirror, and
   a bordering frame,
   wherein said tub-shaped depression receives said mirror and said bordering frame, said bordering frame holding said mirror,
   wherein said tub-shaped depression has a bottom and walls, said depression walls peripherally surround said bordering frame and are formed during blow molding of said sun visor body, and
   wherein said bordering frame includes an outer bead formed during blow-molding of said sun visor body, wherein said tub-shaped depression includes a groove, and wherein said groove receives said outer bead in an interlocked manner to interlock said bordering frame to said sun visor body.

2. The sun visor of claim 1 wherein:
   said bordering frame is comprised of four edges which form a generally rectangular frame defining a generally rectangular opening inward of said four edges, said bordering frame has a groove receptacle which is open along at least one edge of said bordering frame, wherein said groove receptacle extends around the edges of said mirror, said bordering frame further including horizontally oriented ribs, which pass through said frame opening for the rear support of said mirror, and said bordering frame further including vertically oriented ribs which point away from the mirror and are arranged on said horizontally oriented ribs, wherein the material constituting said bottom of said tub-shaped depression is formed in the course of blow-molding said sun visor body and wherein said vertically oriented ribs are supported, with the interposition of said material, on the inner surface of said first wall of said sun visor body.

3. The sun visor of claim 2 further comprising a hinged cover hinged on said bordering frame, said hinged cover covering said mirror when said mirror is not in use.

4. The sun visor of claim 3 wherein said hinged cover has an upper longitudinal edge, wherein said edge defines at least one recess open at said edge, said hinged cover further comprising at least one bearing pin which extends through said recess in said hinged cover, said bordering frame including hinged hooks, wherein said bearing pin cooperates with said hinged hooks provided on said bordering frame, and said hinged cover includes segment bodies which slide on said mirror and maintain said hinged cover in the opened position and in the closed position.

5. The sun visor of claim 1 further comprising a hinged cover hinged on said bordering frame, said hinged cover covering said mirror when said mirror is not in use.

6. The sun visor of claim 5 wherein said hinged cover has an upper longitudinal edge, wherein said edge defines at least one recess open at said edge, said hinged cover further comprising at least one bearing pin which extends through said recess in said hinged cover, said bordering frame including hinged hooks, wherein said bearing pin cooperates with said hinged hooks provided on said bordering frame, and said hinged cover includes segment bodies which slide on said mirror and maintain said hinged cover in the opened position and in the closed position.

7. The sun visor of claim 5 wherein said sun visor body, said bordering frame, and said hinged cover are matched to the color of the interior fittings of the vehicle.

8. The sun visor of claim 1 wherein said sun visor body is made from a polypropylene material.

9. The sun visor of claim 1 wherein said sun visor body has a grainy surface structure looking like grained leather.

10. The sun visor of claim 1 further comprising at least one add-on element having plug pins.

11. The sun visor of claim 10 wherein said sun visor body is embodied with beads which extend from the outer surface of said second wall until they rest against the inner surface of said first wall, wherein said beads are provided for stabilizing said sun visor body and are provided for receiving said plug pins of said add-on element.

12. The sun visor of claim 11 wherein said add-on element is a ticket clip.

13. The sun visor of claim 10 wherein said second wall defines a recess, said recess having a bottom, wherein beads extend from said bottom of said recess until they rest against the inner surface of first wall, wherein said beads are provided for stabilizing said sun visor body and for receiving said plug pins of said add-on element.

14. The sun visor of claim 13 wherein said add-on element is a ticket clip.

15. The sun visor of claim 1 further comprising a hinged cover and an add-on element, wherein said bordering frame, said hinged cover and said add-on element are matched to the color of the interior fittings of the vehicle.

16. The sun visor of claim 1 further comprising a hinged cover and an add-on element, wherein said bordering frame, said hinged cover and said add-on element are each plastic injection molded parts.

17. A sun visor for vehicles comprising:

a hollow, blow-molded sun visor body, said sun visor body having a first wall and a second wall, said first wall forming an essentially flat broad side of the sun visor body, said second wall forming a broad side of the sun visor body, said second wall defining a tub-shaped depression in said second wall, a mirror, a bordering frame comprised of four edges which form a generally rectangular frame defining a generally rectangular opening inward of said four edges, said bordering frame having a groove receptacle which is open along at least one edge of said bordering frame, wherein said groove receptacle extends around the edges of said mirror, said bordering frame further including horizontally oriented ribs, which pass through said frame opening for the rear support of said mirror, said bordering frame further including vertically oriented ribs which point away from the mirror and are arranged on said horizontally oriented ribs, wherein said vertically oriented ribs are supported on the inner surface of said first wall of said sun visor body, and a hinged cover hinged on said bordering frame, said hinged cover covering said mirror when said mirror is not in use, wherein said tub-shaped depression receives said mirror and said bordering frame, and said bordering frame holds said mirror, wherein said tub-shaped depression has a bottom and walls, said depression walls peripherally surrounding said bordering frame and formed during blow molding of said sun visor body, and wherein said bordering frame includes an outer bead formed during blow-molding of said sun visor body, wherein said tub-shaped depression includes a groove, and wherein said groove receives said outer bead in an interlocked manner to interlock said bordering frame to said sun to visor body.

18. The sun visor of claim 17 further comprising an add-on element having plug pins.

19. The sun visor of claim 18 wherein said sun visor body is embodied with beads which extend from the outer surface of said second wall until they rest against the inner surface of said first wall, wherein said beads are provided for stabilizing said sun visor body and are provided for receiving said plug pins of said add-on element.

20. The sun visor of claim 18 wherein said second wall defines a recess, said recess having a bottom, said sun visor body being embodied with beads, wherein said beads extend from said bottom of said recess until they rest against the inner surface of first wall, wherein said beads are provided for stabilizing the sun visor body and for receiving said plug pins of said add-on element.

\* \* \* \* \*